United States Patent
Osypov et al.

(10) Patent No.: US 10,725,189 B2
(45) Date of Patent: Jul. 28, 2020

(54) SYSTEM AND METHOD FOR SEISMIC FACIES IDENTIFICATION USING MACHINE LEARNING

(71) Applicant: CHEVRON U.S.A. INC., San Ramon, CA (US)

(72) Inventors: Konstantin Osypov, Houston, TX (US); David Wilkinson, Houston, TX (US); Laura L. Bandura, Houston, TX (US); Adam Dean Halpert, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 266 days.

(21) Appl. No.: 15/730,814

(22) Filed: Oct. 12, 2017

(65) Prior Publication Data
US 2018/0106917 A1    Apr. 19, 2018

Related U.S. Application Data (60) Provisional application No. 62/408,188, filed on Oct. 14, 2016.

(51) Int. Cl.
| | |
|---|---|
| *G01V 1/30* | (2006.01) |
| *G06N 20/00* | (2019.01) |
| *G01V 1/00* | (2006.01) |
| *G01V 1/50* | (2006.01) |

(52) U.S. Cl.
CPC .............. *G01V 1/301* (2013.01); *G01V 1/003* (2013.01); *G01V 1/50* (2013.01); *G06N 20/00* (2019.01)

(58) Field of Classification Search
CPC .......... G01V 1/301; G01V 1/50; G01V 1/003; G06N 20/00
See application file for complete search history.

(56) References Cited

U.S. PATENT DOCUMENTS

| | | | | |
|---|---|---|---|---|
| 6,487,502 | B1 * | 11/2002 | Taner ....................... | G01V 1/32 |
| | | | | 702/14 |
| 7,720,609 | B2 * | 5/2010 | Meldahl .................. | G01V 1/288 |
| | | | | 702/17 |
| 7,769,546 | B2 | 8/2010 | Lomask et al. | |
| 8,010,294 | B2 * | 8/2011 | Dorn ....................... | G01V 1/30 |
| | | | | 702/14 |
| 9,542,507 | B2 * | 1/2017 | Bo .......................... | G01V 1/301 |
| 9,581,710 | B2 * | 2/2017 | Leiceaga ................. | G01V 1/306 |
| 10,324,229 | B2 * | 6/2019 | Theologou ........... | G01V 99/005 |
| 10,393,899 | B2 * | 8/2019 | Curry ..................... | G01V 1/301 |

(Continued)

OTHER PUBLICATIONS

PCT International Search Report and Written Opinion, International Application No. PCT/US2017/056282, dated Dec. 8, 2017, 14 pages.

(Continued)

*Primary Examiner* — Mohammad K Islam
(74) *Attorney, Agent, or Firm* — Sheppard, Mullin, Richter & Hampton LLP (57) ABSTRACT

A method is described for seismic facies identification including receiving a seismic dataset representative of a subsurface volume of interest; performing a machine learning algorithm on the seismic dataset to identify seismic facies and generate a classified seismic image; and identifying geologic features based on the classified seismic image. The method may be executed by a computer system.

11 Claims, 10 Drawing Sheets

(56) References Cited

U.S. PATENT DOCUMENTS

| | | | |
|---|---|---|---|
| 2002/0183932 A1* | 12/2002 | West | G01V 1/32 702/14 |
| 2003/0200030 A1 | 10/2003 | Meldahl et al. | |
| 2005/0090986 A1* | 4/2005 | Van Riel | G01V 1/30 702/6 |
| 2005/0288863 A1* | 12/2005 | Workman | G06K 9/46 702/14 |
| 2006/0184488 A1* | 8/2006 | Wentland | G06K 9/6253 706/45 |
| 2009/0093963 A1* | 4/2009 | Rasolofosaon | G01V 1/306 702/14 |
| 2012/0150447 A1* | 6/2012 | Van Hoek | G01V 1/301 702/13 |
| 2012/0261135 A1* | 10/2012 | Nowak | G01V 1/301 166/369 |
| 2013/0151161 A1* | 6/2013 | Imhof | G06F 17/00 702/14 |
| 2014/0345857 A1* | 11/2014 | Imhof | E21B 41/0092 166/250.09 |
| 2016/0161635 A1* | 6/2016 | Ramsay | G01V 11/00 703/9 |
| 2018/0136350 A1* | 5/2018 | Dell'Aversana | G01V 1/32 |

OTHER PUBLICATIONS

Hami-Eddine, Kamal, Anomaly detection using dynamic Neural Networks, classification of prestack data, © 2012 SEG, Las Vegas Annual Meeting DOI http://dx.doi.org/10.1190/segam2012-1222.1.

Hami-Eddine, Kamal, A new technique for lithology and fluid content prediction from prestack data: An application to a carbonate reservoir, Interpretation, Feb. 2015, pp. 1-14.

Guillen, Pablo, Supervised learning to detect salt body, © 2015 SEG, New Orleans Annual Meeting DOI http://dx.doi.org/10.1190/segam2015-5931401.1.

Marroquin, Ivan D., A visual data-mining methodology for seismic facies analysis: Part 1—Testing and comparison with other unsupervised clustering methods, Geophysics,vol. 74, No. 1 Jan.-Feb. 2009; p. P1-P11.

U.S. Appl. No. 14/595,964, filed Jan. 13, 2015, Wang et al.

U.S. Appl. No. 14/595,964, Wang et al, filed Jan. 13, 2015.

Breiman, Leo. "Random forests." Machine learning 45, No. 1 (2001): 5-32.

Hartigan, John A., and Manchek A. Wong. "Algorithm AS 136: A k-means clustering algorithm." Journal of the Royal Statistical Society. Series C (Applied Statistics) 28, No. 1 (1979): 100-108.

Kohonen, Teuvo. "The self-organizing map." Proceedings of the IEEE 78, No. 9 (1990): 1464-1480.

Krizhevsky, Alex, Ilya Sutskever, and Geoffrey E. Hinton. "Imagenet classification with deep convolutional neural networks." In Advances in neural information processing systems, pp. 1097-1105. 2012.

LeCun, Yann, Yoshua Bengio, and Geoffrey Hinton. "Deep learning." Nature 521, No. 7553 (2015): 436-444.

Lippmann, Richard. "An introduction to computing with neural nets." IEEE Assp magazine 4, No. 2 (1987): 4-22.

* cited by examiner

SYSTEM AND METHOD FOR SEISMIC FACIES IDENTIFICATION USING MACHINE LEARNING

CROSS-REFERENCE TO RELATED APPLICATIONS

The present application claims the priority benefit of U.S. Provisional Application Ser. No. 62/408,188, filed on Oct. 14, 2016, which is incorporated herein by reference in its entirety.

STATEMENT REGARDING FEDERALLY SPONSORED RESEARCH OR DEVELOPMENT

Not applicable.

TECHNICAL FIELD

The disclosed embodiments relate generally to techniques for identifying facies in subsurface reservoirs and, in particular, to a method of identifying facies from seismic data via machine learning.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. The seismic image can be used to obtain seismic facies. Seismic facies are groups of reflections in the seismic image that can be categorized based on characteristics such as amplitude (e.g., amplitude variation with offset/angle), continuity, geometry, and/or texture. Knowledgeable practitioners can interpret these facies as corresponding to subsurface properties such as lithology, depositional environment, and fluid content. This information may be used in a hydrocarbon exploration setting to search for ideal geological settings for hydrocarbon reservoirs, and for model-building purposes to assign appropriate properties (velocity, density, permeability, porosity, etc.) within the individual facies.

Prior art includes approaches based on classifying data on a trace-by-trace basis using, for example, neural nets or self-organizing maps. This can be detrimental to accurately representing the true geometry or connectivity of geological features. Moreover, these trace-by-trace methods are time consuming and create bottlenecks in the process of characterizing the subsurface.

The ability to identify facies in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for determining 3-D distributions of seismic facies from seismic images more efficiently and accurately that will allow better seismic interpretation of potential hydrocarbon reservoirs.

SUMMARY

In accordance with some embodiments, a method of seismic facies identification including receiving a seismic dataset representative of a subsurface volume of interest; performing a machine learning algorithm on the seismic dataset to identify seismic facies and generate a classified seismic image; and identifying geologic features based on the classified seismic image is disclosed. In an embodiment, the machine learning algorithm is an unsupervised algorithm that may optionally assign facies labels to the classified seismic image and may optionally classify the seismic data based on its amplitude variation with angle (AVA) or offset (AVO) response. In another embodiment, the machine learning algorithm is a supervised algorithm that may optionally receive a set of facies labels as input and used them in the supervised algorithm. The methods disclosed herein may also include using artificial intelligence in data space to recognize stratigraphic patterns prior to the identifying geologic features and/or receiving a computational stratigraphy model prior to the performing the machine learning algorithm, using the computational stratigraphy model in the machine learning algorithm, and performing a matching step wherein the machine learning algorithm matches seismic expressions of specific features from the computational stratigraphy model to patterns found in the seismic dataset.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of seismic facies identification via machine learning. These embodiments are designed to be of particular use for seismic imaging of subsurface volumes in geologically complex areas. These approaches use geometric and/or textural characteristics associated with seismic facies and identifies them using established or novel machine learning techniques. Machine learning techniques may be able to take advantage of significant computational processing power to uncover patterns in data that would be difficult for human interpreters to spot, leading to more accurate facies classifications.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention includes embodiments of a method and system for seismic facies identification that produces 3-D digital images of seismic facies. This will help to alleviate bottlenecks created by the necessity of manually interpreting seismic facies for exploration, model-building, or reservoir modeling purposes. The present invention may be able to take advantage of significant computational processing power uncover patterns in data that would be difficult for human interpreters to spot, leading to more accurate facies classifications.

Figure 1:
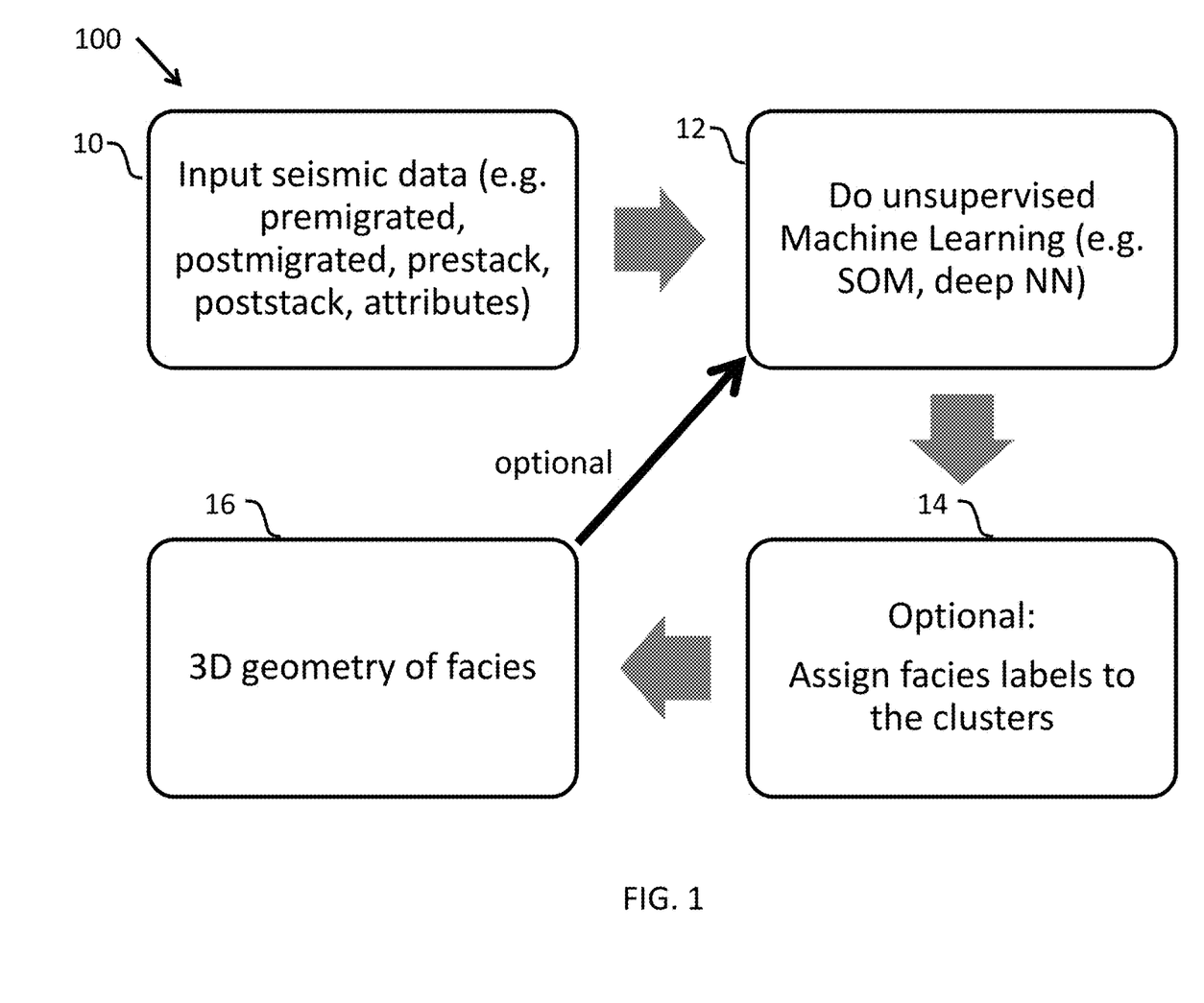
FIG. 1 illustrates a flowchart of a method of seismic facies identification, in accordance with some embodiments.

FIG. 1 illustrates a flowchart of a method 100 for seismic facies identification in a subsurface volume of interest. At operation 10, a seismic dataset is received. As previously described, the seismic dataset includes a plurality of traces recorded at a plurality of seismic sensors. This dataset may have already been subjected to a number of seismic processing steps, such as deghosting, multiple removal, spectral shaping, imaging, and the like. These examples are not meant to be limiting. Those of skill in the art will appreciate that there are a number of useful seismic processing steps that may be applied to seismic data. The seismic dataset can be raw trace data, pre-stack gathers, or a migrated image/volume that may be pre-stack or post-stack; in the case of migrated data, the input may or may not be volumetrically flattened prior to analysis. In the case of pre-stack gathers or a pre-stack migrated image, the dataset will include an offset and/or angle dimension, representative of the distance between the source-receiver pairs. The offset and/or angle dimension will include seismic events with amplitudes that vary along the offset or angle which those of skill in the art know as amplitude variation with offset (AVO) or amplitude variation with angle (AVA). For the purposes of this paper, AVO and AVA are collectively referred to as AVA.

Continuing method 100, at operation 12 the seismic dataset is subjected to unsupervised machine learning. The input data is automatically classified or clustered into distinct groups based on characteristics of the input data. This classification can be accomplished by algorithms such as, but not limited to, k-means clustering (described in Hartigan and Wong, 1979), self-organizing maps (Kohonen, 1990), or deep learning techniques (Lecun et al., 2015). The classification allows the input data to be aggregated into groups that improve the signal-to-noise ratio in appropriate ways for those clusters. In an embodiment, the unsupervised classification may be a data-driven, automated approach to seismic aggregation (i.e., clustering) capable of automatically determining the appropriate data to evaluate for robust, representative AVA responses corresponding to a subsurface location. The classification may be performed on multiple local and global scales to determine regions of rock and fluid property similarity and differences. For example, local clustering may aggregate localized data based on raw amplitudes or seismic-derived features such as texture attributes. Global clustering may be done for refinement of clustering for specific AVA Class response or additional rock and fluid property interrogation (e.g., spatial porosity variations, volumetric prospect screening), possibly distinguishing between different fluid content (e.g., brine vs. gas) in the same lithology. In another embodiment, unsupervised machine learning can cluster seismic data with a consistent, stable AVA Class response based on the intercept, gradient, and polarity of the seismic events. An example of clustering based on the AVA responses is demonstrated in FIGS. 6A-6D.

Figure 6A:
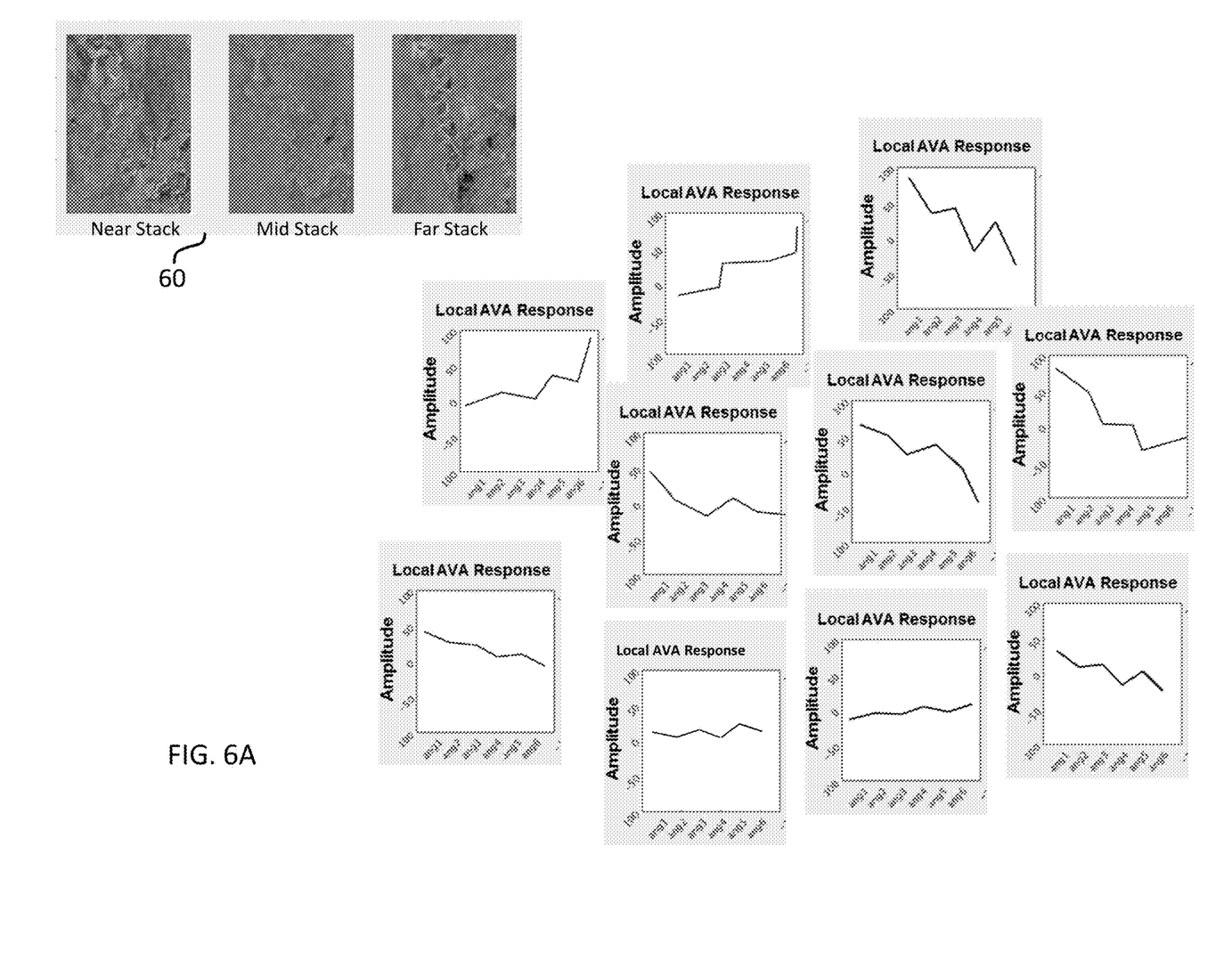
FIGS. 6A-6D demonstrate detailed steps of one of the embodiments.

FIG. 6A demonstrates the input data used for the clustering. In FIG. 6A, panel 60 shows map view depth slices through a seismic image volume for a near stack, mid stack, and far stack image. Those of skill in the art will understand that the partial stacks (near, mid, and far) are a summation of traces along the offset or angle axis for a range of offsets/angles representative of source-receiver distances that are small (near), mid-range (mid), and large (far), calculated from a pre-stack migration. The ten panels labeled "Local AVA Response" in FIG. 6A show examples of amplitude variation with angle (AVA) for individual sample points in the images. Locally, at any subsurface sample the AVA response can be noisy and there is much uncertainty associated with this one measurement.

Figure 6B:
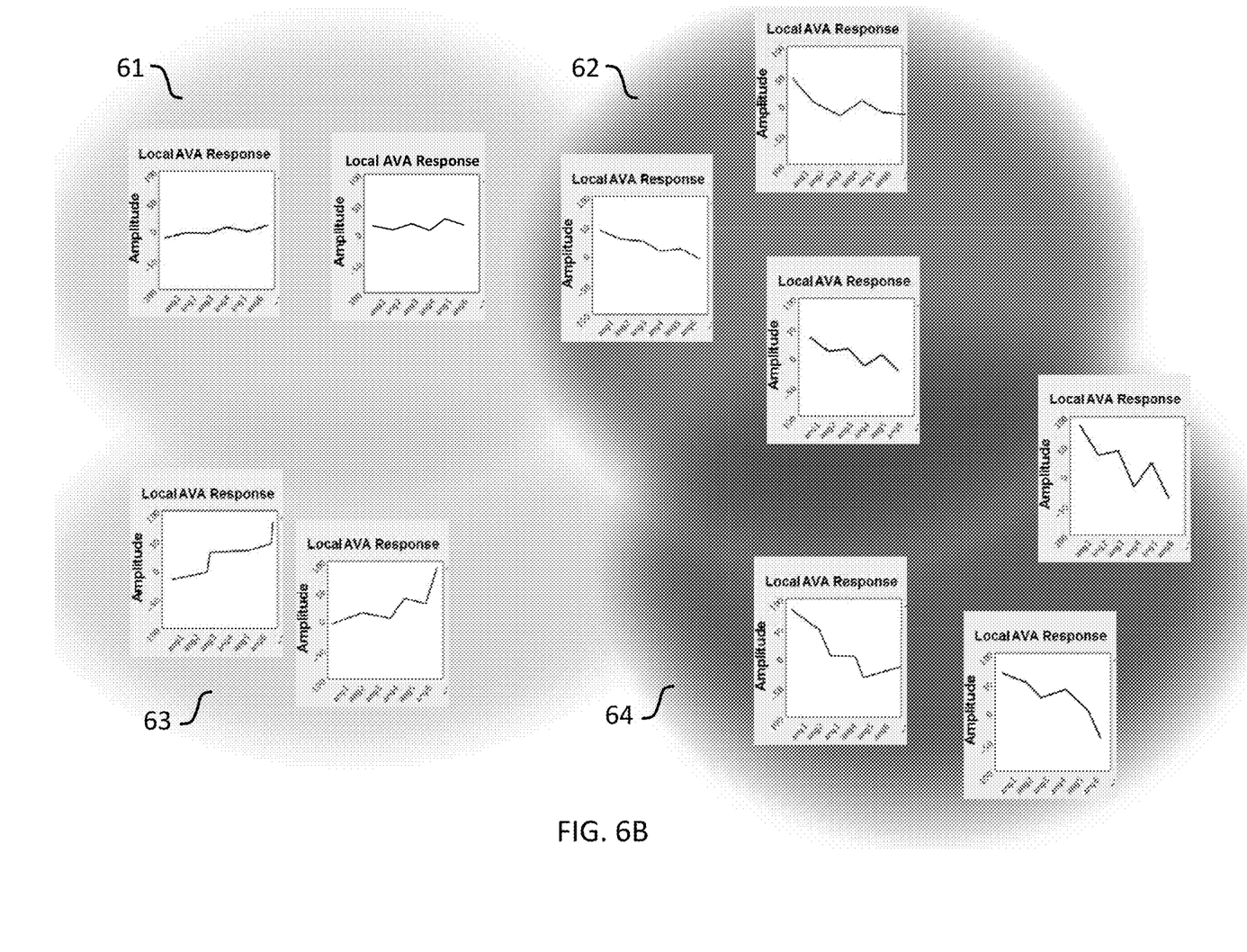

FIG. 6B demonstrates "soft" clustering of the various local AVA responses, aggregating the local AVA responses into soft clusters 61, 62, 63, and 64 based on the type of AVA response. In this soft clustering, the clusters map overlap somewhat and the individual sample points may belong to more than one cluster. Soft clustering may be accomplished, by way of example and not limitation, by Fuzzy C-Means Clustering.

Figure 6C:
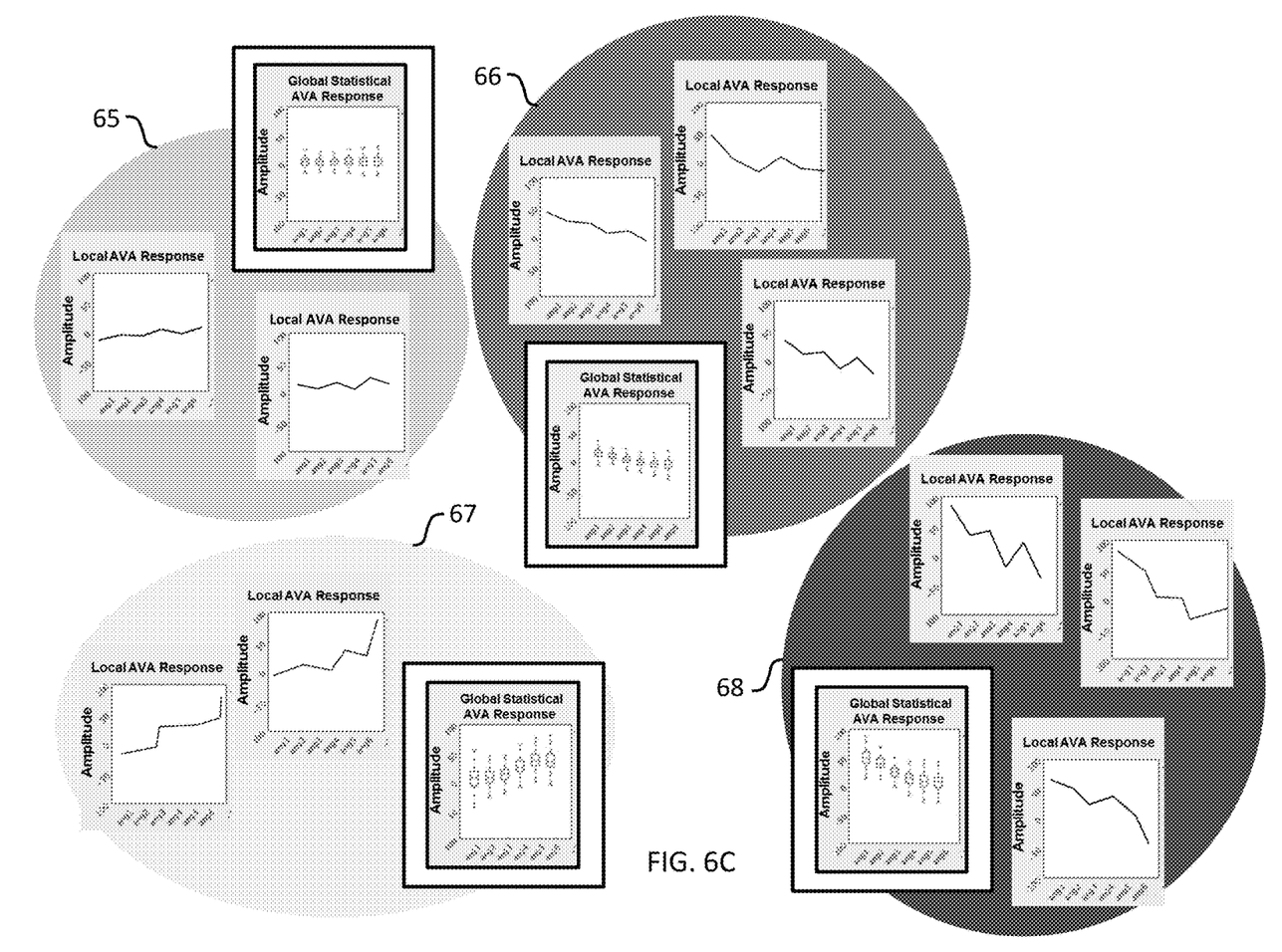

FIG. 6C demonstrates "hard" clustering of the various local AVA responses, aggregating the local AVA responses into clusters 65, 66, 67, and 68 based on the type of AVA response and the probability of it belonging to a cluster. In hard clustering, each sample will belong to just one cluster. Once the local AVA responses are clustered, a global statistical AVA response for each cluster can be calculated from the local AVA responses in that cluster.

Figure 6D:
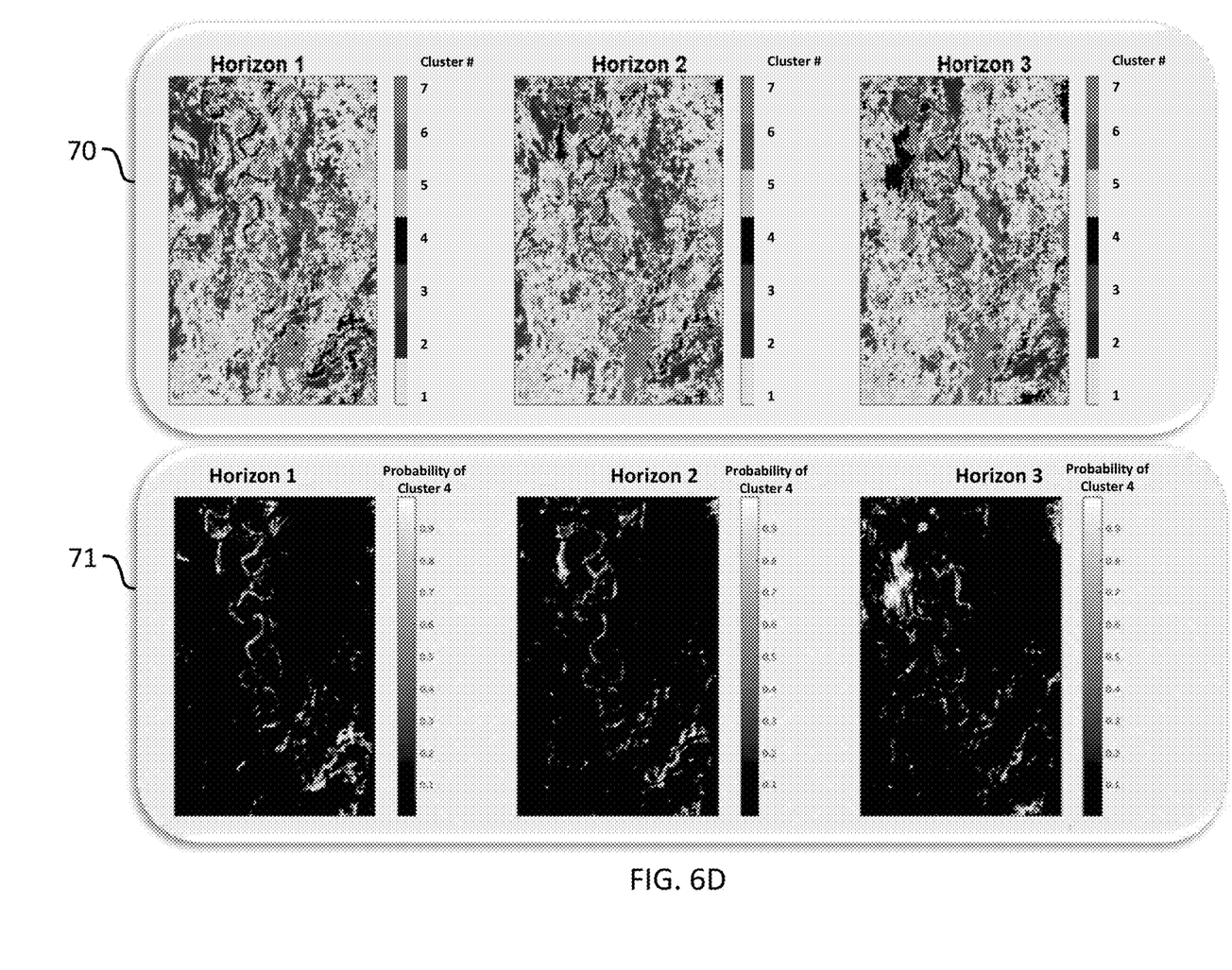

FIG. 6D panel 70 shows the map view images of the samples divided into clusters for three horizons. FIG. 6D panel 71 shows the map view images of the probability of the samples for belonging to one particular cluster for three horizons. One of skill in the art will recognize that these map view images display a recognizable geologic feature known as a meandering stream. Such recognizable geologic features confirm that the clustering is likely to have been accurate.

After the unsupervised machine learning has generated the distinct groups, the groups may optionally be labeled as various facies at operation 14. Whether or not the facies are labeled, the distinct groups are then identified as 3-D geobodies, meaning that the geometry of each group is defined in extent and volume, at operation 16. If desired, the method may repeat (i.e. iterate) operations 12, 14, and 16 until a user-specified stopping point, such as a specified number of iterations or a 3-D volume wherein all points are included within a geobody.

Figure 2:
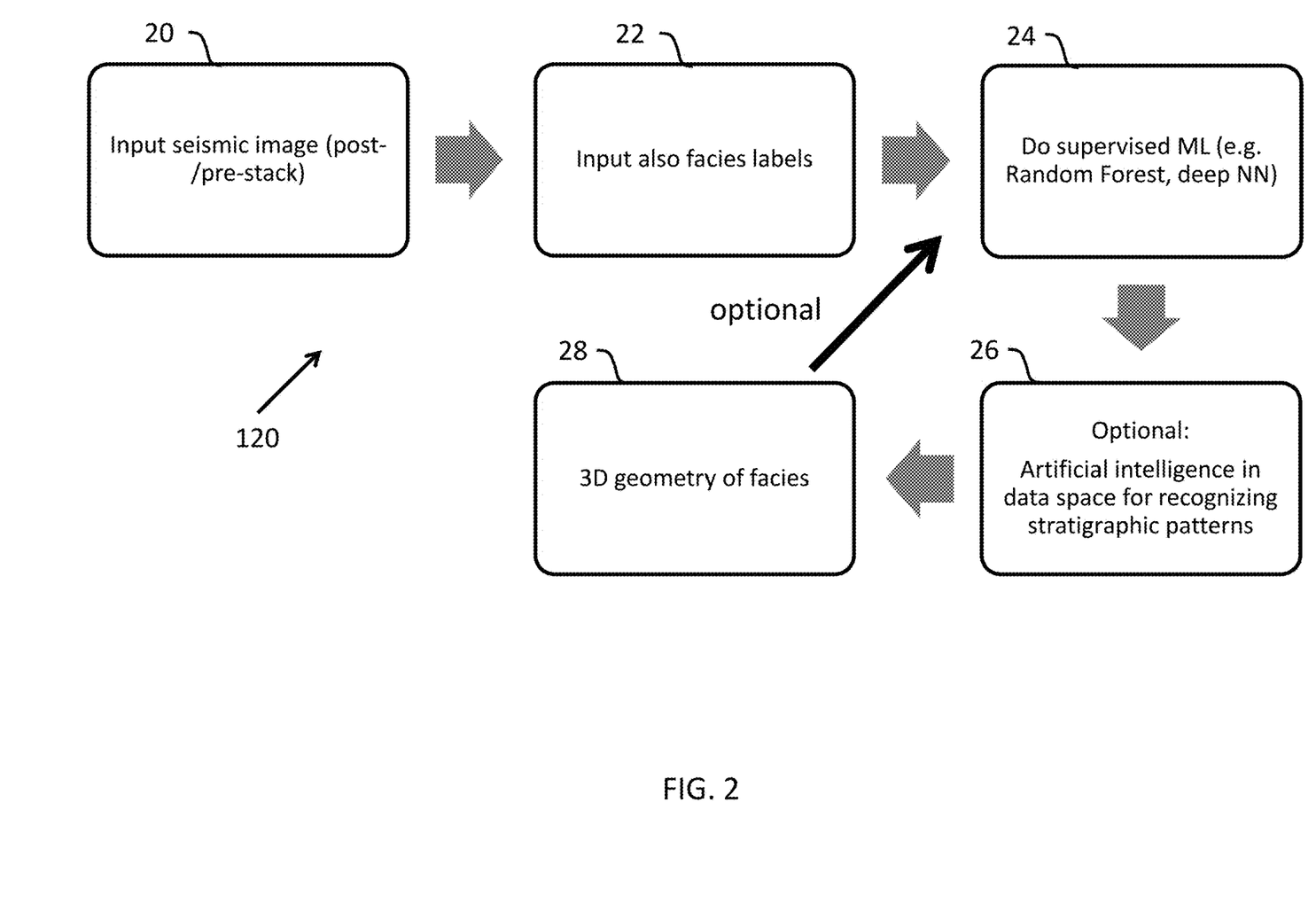
FIG. 2 illustrates a flowchart of a method of seismic facies identification, in accordance with other embodiments.

An alternate embodiment is illustrated as method 120 in FIG. 2. In this embodiment, a seismic dataset is received at operation 20, much like operation 10 of method 100. An optional additional input of a set of facies labels may also be received at operation 22. The facies labels consist of a sub-volume of the input data that has been wholly or partly interpreted and manually assigned a seismic facies category. At the locations where such interpretation has been performed, the input data will therefore consist of both the seismic amplitude at each pixel or voxel of the image, and the corresponding facies label at that pixel or voxel.

The seismic dataset and optional set of facies labels are input to supervised machine learning at operation 24. In this case, the labeled training dataset is first used to "train" a classifier; the classifier is then applied to the unlabeled input data in order to produce a facies distribution that is now specifically labeled. Classification algorithms in this case can include decision-tree methods such as Random Forest (Breiman, 2001); classical neural net methods (Lippmann, 1987); or more novel deep learning methods such as a convolutional neural net (Krizhevsky et al., 2012). Method 120 may optionally include using artificial intelligence computations in the data space to recognize stratigraphic patterns such as channel features. Training data for this optional step may be obtained from sources such as real or synthetic well logs, or simulated stratigraphic models. The 3-D geometry of the geobodies is defined at operation 28. This embodiment may also iterate over operations 24, 26, and 28.

Figure 4:
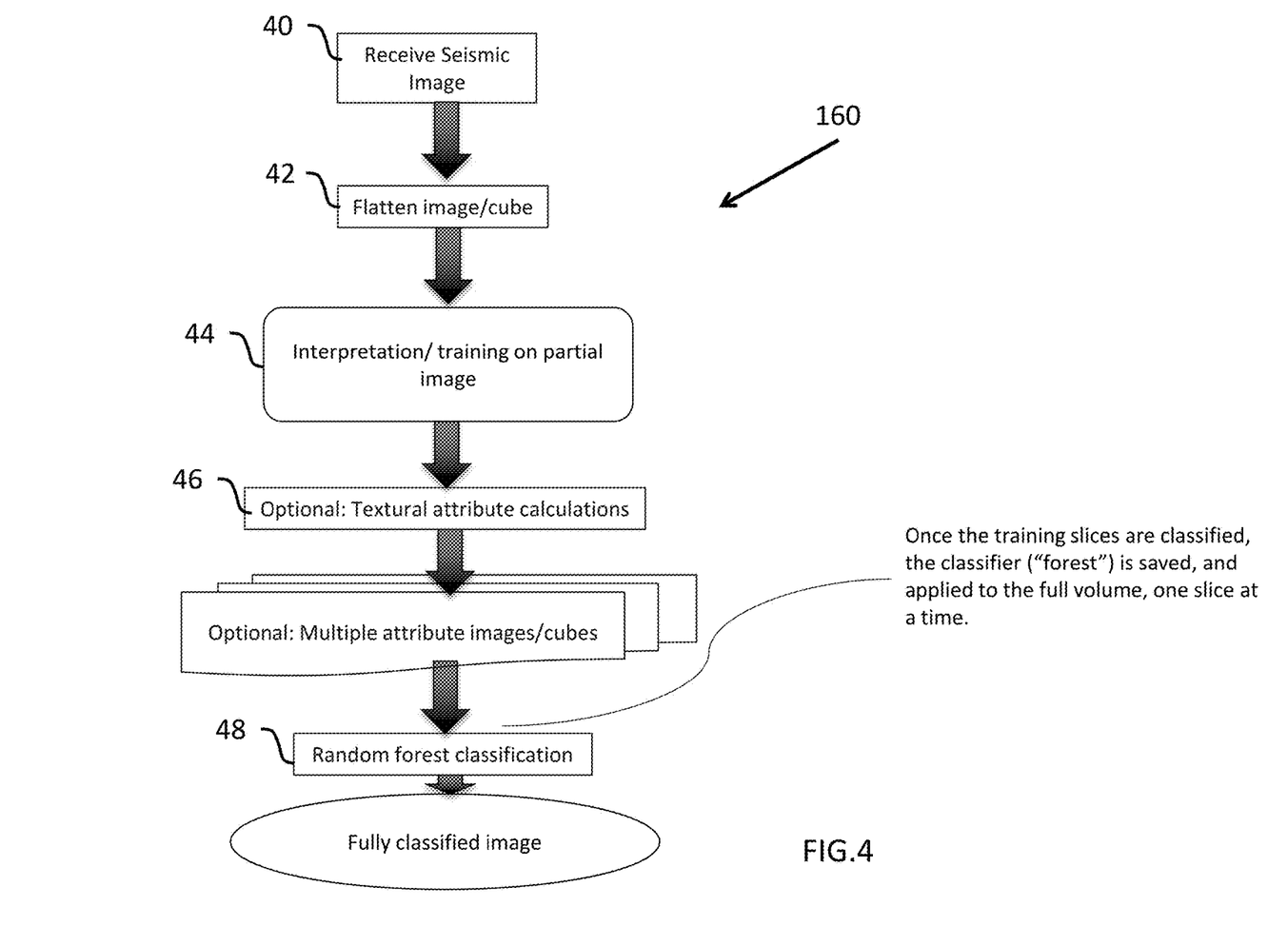
FIG. 4 illustrates a flowchart of a method of seismic facies identification, in accordance with other embodiments.

A specific example of method 120 is shown in FIG. 4 as method 160. It receives a seismic image at operation 40 and flattens it at operation 42, using, for example, a method described in U.S. Pat. No. 7,769,546, Method for Indexing a Subsurface Volume For The Purpose of Inferring Geologic Information, or U.S. patent application Ser. No. 14/595,964, System and Method for Generating a Depositional Sequence Volume from Seismic Data. The flattened image is then interpreted and used as a partial image at operation 44 for input to the Random Forest algorithm at operation 48 to build a classifier based on limited labels provided by an interpreter. The classifier can then be applied to a full seismic volume to produce a 3-D image with the geobodies identified.

Method 160 optionally includes calculating textural attributes at operation 46 as they in particular may be useful for defining the facies distributions geometrically, as described above. The textural attribute calculations result in multiple attribute images that could be input to the Random Forest algorithm at operation 48 to produce a 3-D image with the geobodies identified.

Figure 3:
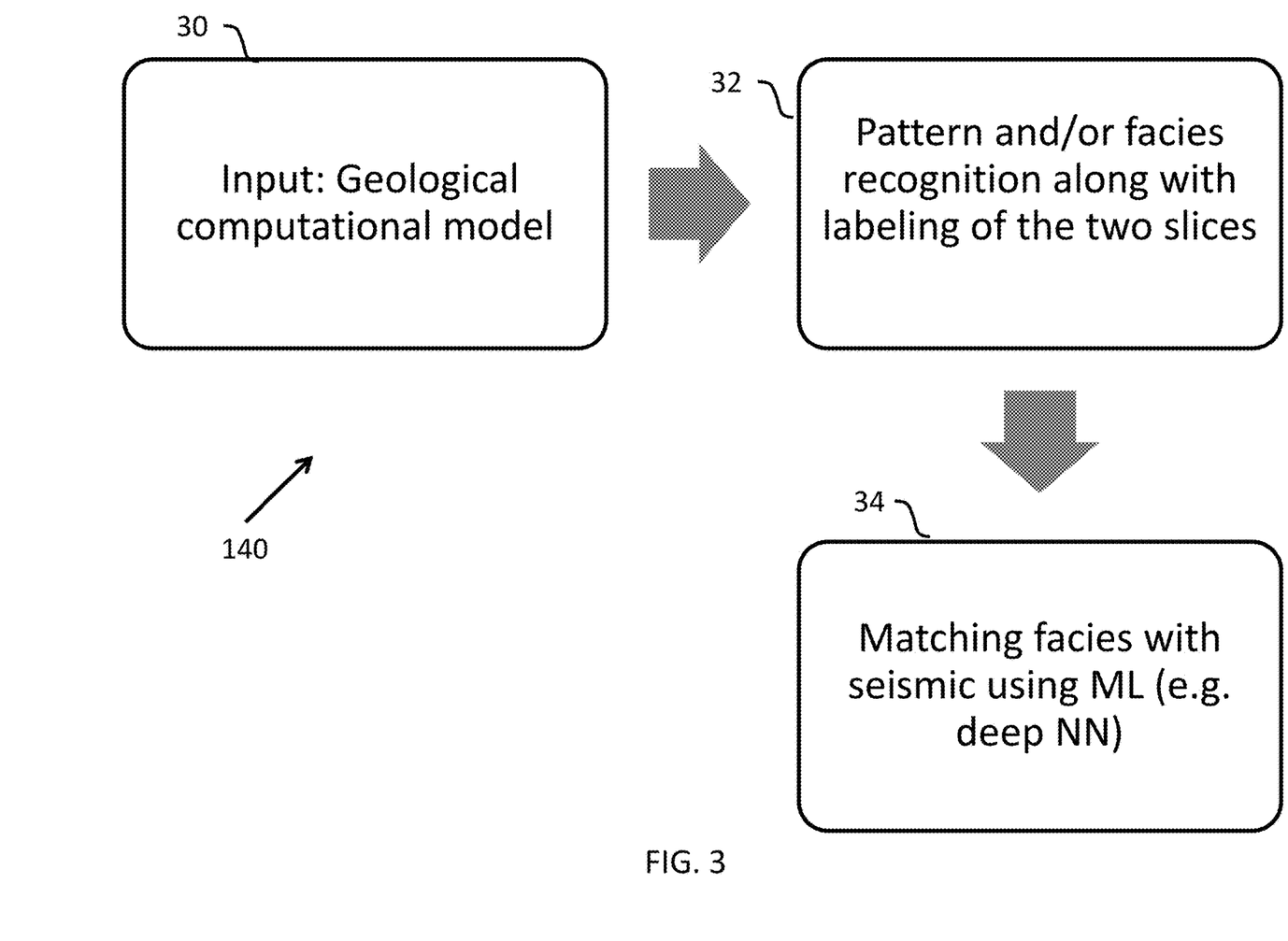
FIG. 3 illustrates a flowchart of a method of seismic facies identification, in accordance with other embodiments.

FIG. 3 shows an optional workflow extension (method 140) of any of the methods 100, 120, or 160. If an appropriate computational stratigraphy model is available, it can be received as input 30 to enhance the facies distribution result by inferring additional information about the lithology, connectivity, and/or flow characteristics of certain facies at operation 32. This can be achieved via an additional matching step at operation 34, in which a machine learning technique matches the seismic expression of specific features from the model to patterns found in the input seismic data. This extension is viable for either the supervised or unsupervised learning cases discussed above.

Figure 5:
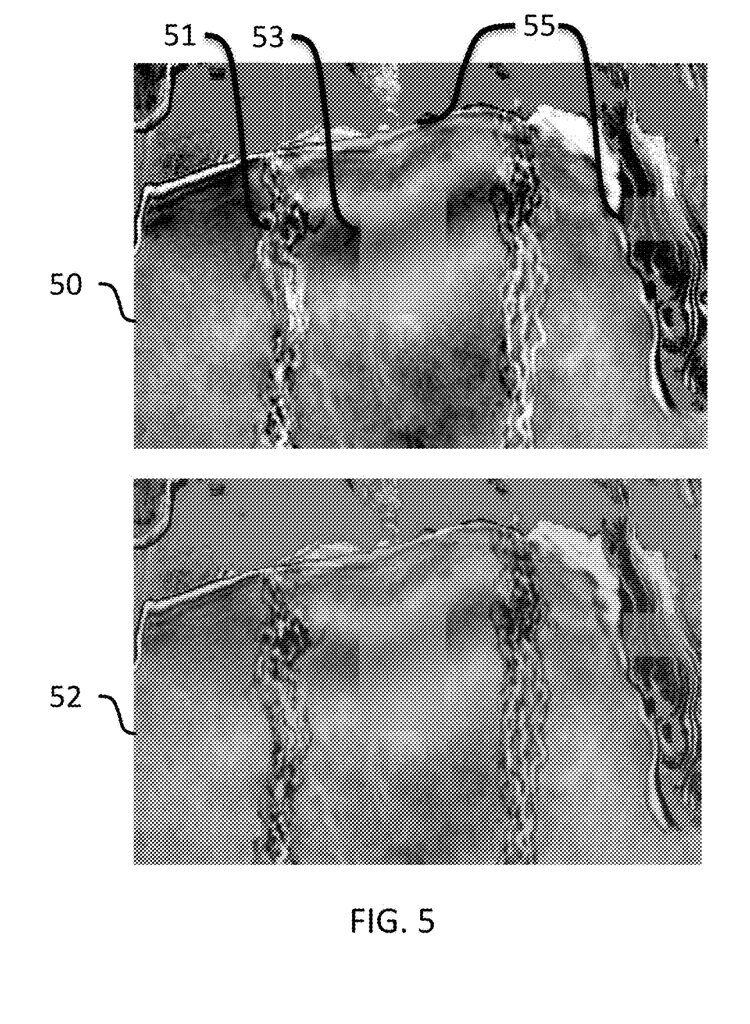
FIG. 5 demonstrates the result of one of the embodiments.

FIG. 5 demonstrates the result of using one of the embodiments of the present invention. In particular, it shows the result of method 120 of FIG. 2. Panel 50 shows a single depth slice of a seismic image. The input facies labels are shown as the red line 51, green rectangle 53, and purple rectangle and line 54. After performing the method 120 of FIG. 2, this depth slice now shows the classification result 52 wherein the seismic facies have been identified as extensive geobodies.

Figure 7:
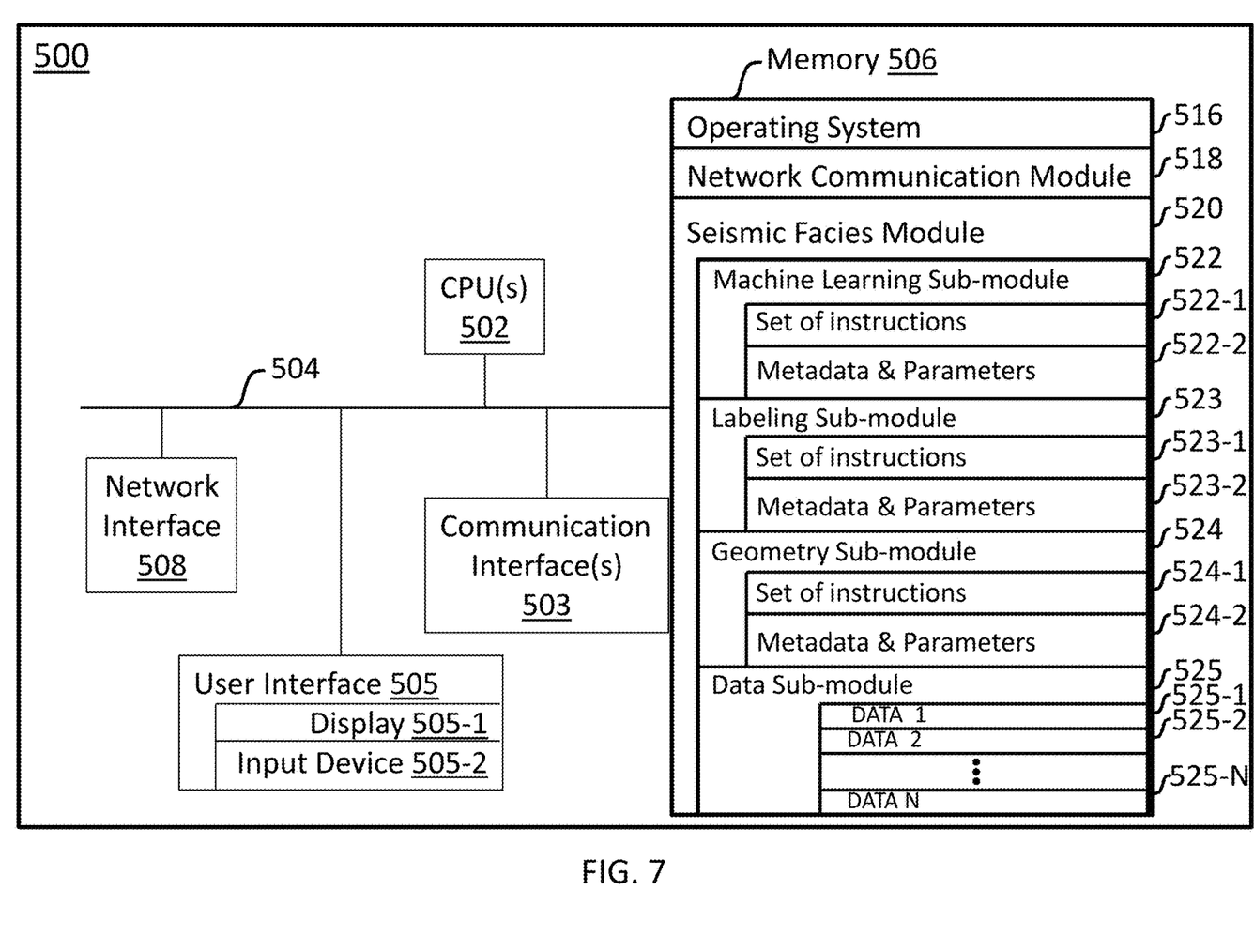
FIG. 7 is a block diagram illustrating a seismic facies identification system, in accordance with some embodiments.

FIG. 7 is a block diagram illustrating a seismic facies identification system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic facies identification system 500 includes one or more processing units (CPUs) 502, one or more network interfaces 508 and/or other communications interfaces 503, memory 506, and one or more communication buses 504 for interconnecting these and various other components. The seismic facies identification system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the seismic facies module 520 executes the operations of method 100. Seismic facies module 520 may include data sub-module 525, which handles the seismic dataset including seismic gathers 525-1 through 525-N. This seismic data is supplied by data sub-module 525 to other sub-modules.

Machine learning sub-module 522 contains a set of instructions 522-1 and accepts metadata and parameters 522-2 that will enable it to execute, for example, operation 12 of method 100, operation 24 of method 120, operation 32 of method 140, and/or operation 44 of method 160. The labeling function sub-module 523 contains a set of instructions 523-1 and accepts metadata and parameters 523-2 that will enable it to contribute to, for example, operation 14 of method 100, operation 22 of method 120, and/or operation 32 of method 140. The geometry sub-module 524 contains a set of instructions 524-1 and accepts metadata and parameters 524-2 that will enable it to execute, for example, operation 16 of method 100, operation 28 of method 120, operation 34 of method 140, and/or operations 46 and 48 of method 160. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic facies image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, methods 100, 120, 140, and 160 are described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

REFERENCES

U.S. Pat. No. 7,769,546, Method for Indexing a Subsurface Volume For The Purpose of Inferring Geologic Information U.S. patent application Ser. No. 14/595,964, System and Method for Generating a Depositional Sequence Volume from Seismic Data Breiman, Leo. "Random forests." Machine learning 45, no. 1 (2001): 5-32.

Hartigan, John A., and Manchek A. Wong. "Algorithm AS 136: A k-means clustering algorithm." Journal of the Royal Statistical Society. Series C (Applied Statistics) 28, no. 1 (1979): 100-108.

Kohonen, Teuvo. "The self-organizing map." Proceedings of the IEEE 78, no. 9 (1990): 1464-1480.

Krizhevsky, Alex, Ilya Sutskever, and Geoffrey E. Hinton. "Imagenet classification with deep convolutional neural networks." In Advances in neural information processing systems, pp. 1097-1105. 2012.

LeCun, Yann, Yoshua Bengio, and Geoffrey Hinton. "Deep learning." Nature 521, no. 7553 (2015): 436-444.

Lippmann, Richard. "An introduction to computing with neural nets." IEEE Assp magazine 4, no. 2 (1987): 4-22.

What is claimed is:

1. A computer-implemented method of seismic facies identification, comprising:
   a. receiving, at a computer processor, a seismic dataset representative of a subsurface volume of interest, wherein individual ones of the seismic dataset comprise signal-to-noise characteristics;
   b. performing a machine learning algorithm on the seismic dataset to identify seismic facies and clustering the seismic dataset into seismic subsets based on the signal-to-noise characteristics of the individual ones of the seismic dataset, wherein the machine learning algorithm comprises local clustering and global clustering, wherein local clustering is based on one or both of raw amplitudes and a seismic-derived feature, and wherein global clustering is based on one or both of an AVA Class response and an additional rock and fluid property interrogation;
   c. generating a classified seismic image based on the seismic subsets; and
   d. identifying geologic features based on the classified seismic image.

2. The method of claim 1 wherein the machine learning algorithm is an unsupervised algorithm.

3. The method of claim 2 wherein the classified seismic image is assigned facies labels.

4. The method of claim 2 wherein the unsupervised algorithm classifies seismic data in the seismic dataset based on AVA.

5. The method of claim 4 wherein the geologic features include differences in fluid content of the subsurface volume of interest.

6. The method of claim 1 wherein the machine learning algorithm is a supervised algorithm.

7. The method of claim 6 wherein a set of facies labels is received as input and used in the supervised algorithm.

8. The method of claim 6 further comprising using artificial intelligence in data space to recognize stratigraphic patterns prior to the identifying geologic features.

9. The method of claim 1 further comprising receiving a computational stratigraphy model prior to the performing the machine learning algorithm, using the computational stratigraphy model in the machine learning algorithm, and performing a matching step wherein the machine learning algorithm matches seismic expressions of specific features from the computational stratigraphy model to patterns found in the seismic dataset.

10. A computer system, comprising:
   one or more processors;
   memory; and
   one or more programs, wherein the one or more programs are stored in the memory and configured to be executed by the one or more processors, the one or more programs including instructions that when executed by the one or more processors cause the device to:
     receive, at the one or more processors, a seismic dataset representative of a subsurface volume of interest, wherein individual ones of the seismic dataset comprise signal-to-noise characteristics;
     perform a machine learning algorithm on the seismic dataset to identify seismic facies and cluster the seismic dataset into seismic subsets based on the signal-to-noise characteristics of the individual ones of the seismic dataset, wherein the machine learning algorithm comprises local clustering and global clustering, wherein local clustering is based on one or both of raw amplitudes or seismic-derived features, and wherein global clustering is based on one or both of an AVA Class response and an additional rock and fluid property interrogation;
     generate a classified seismic image based on the seismic subsets; and
     identify geologic features based on the classified seismic image.

11. A non-transitory computer readable storage medium storing one or more programs, the one or more programs comprising instructions, which when executed by an electronic device with one or more processors and memory, cause the device to:
   receive, at one or more processors, a seismic dataset representative of a subsurface volume of interest, wherein individual ones of the seismic dataset comprise signal-to-noise characteristics;
   perform a machine learning algorithm on the seismic dataset to identify seismic facies and cluster the seismic dataset into seismic subsets based on the signal-to-noise characteristics of the individual ones of the seismic dataset, wherein the machine learning algorithm comprises local clustering and global clustering, wherein local clustering is based on one or both of raw amplitudes or seismic-derived features, and wherein global clustering is based on one or both of an AVA Class response and an additional rock and fluid property interrogation;
   generate a classified seismic image based on the seismic subsets; and
   identify geologic features based on the classified seismic image.

* * * * *